(No Model.)

A. B. STONE.
POCKET SCREW DRIVER.

No. 537,246. Patented Apr. 9, 1895.

Witnesses
A. W. Stipek
Willie Eck

Inventor
Arthur B. Stone.
By James Shepard.
Atty.

UNITED STATES PATENT OFFICE.

ARTHUR B. STONE, OF WINDSOR, CONNECTICUT.

POCKET SCREW-DRIVER.

SPECIFICATION forming part of Letters Patent No. 537,246, dated April 9, 1895.

Application filed December 10, 1894. Serial No. 531,355. (No model.)

*To all whom it may concern:*

Be it known that I, ARTHUR B. STONE, a citizen of the United States, residing at Windsor, in the county of Hartford and State of Connecticut, have invented certain new and useful Improvements in Pocket Screw-Drivers, of which the following is a specification.

My invention relates to pocket implements having one or more swinging tools such as screw drivers, reamers, boring tools, &c., and the main object of my improvements is to make a cheap, durable and efficient implement in a compact and convenient form.

Figure 1:
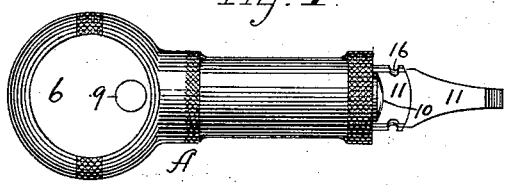
Figure 2:
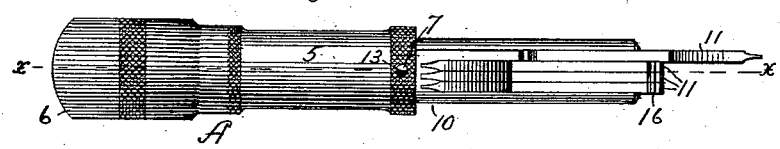
Figure 3:
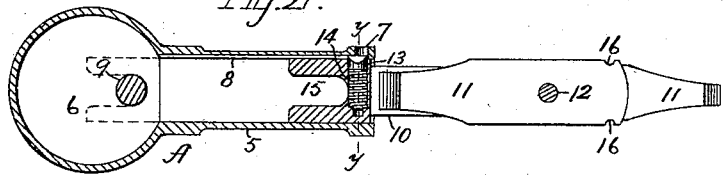
Figure 4:
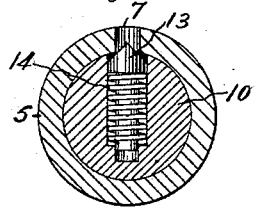

In the accompanying drawings, Figure 1 is a side elevation of my implement with one tool turned outwardly and set back into the handle ready for use. Fig. 2 is an edge view of the same with the sliding tool head and all of the tools drawn out of the handle ready for turning any of the tools. Fig. 3 is a longitudinal section of the same on the line $x\,x$ of Fig. 2, the friction pin and spring being shown in elevation; and Fig. 4 is an enlarged transverse section on the line $y\,y$ of Fig. 3, the pin and spring being shown in elevation.

A designates the handle which in the main may be of any desired form but I prefer to make it with a cylindrical shank 5 and flattened head 6. The shank 5 is provided with a cylindrical hole as if bored out longitudinally while the head may be still further chambered out to correspond with its external form. I prefer to form this shank and head of one and the same piece and it may be done by casting on a core. I provide the outer end of the shank 5 with a hole 7 through one of its walls and from said hole to the chamber in the head is a shallow groove 8 preferably of V form in cross section. I also provide the head with a cross rib or pin 9 with its axis in a plane passing centrally along the length of the shank. Within the handle is the sliding tool head 10. It is substantially a cylindrical piece with its outer end slotted to receive the swinging tools 11 which are pivoted therein by the screw or pin 12 Fig. 3, while its inner end is slotted or forked as at 15 Fig. 3, to receive the cross pin 9. It is also bored transversely to receive the friction pin 13 and its spring 14. This pin is preferably shouldered near its outer end to form a seat for one end of the spring while the other end of said spring rests upon the bottom of the transverse hole or upon a shoulder near the bottom thereof as in ordinary spring pressed pins whereby the spring has a constant tendency to force the pin outwardly. The end of this friction pin is shaped to fit the cross section of the guiding groove in the inner wall of the shank.

The tools shown in the drawings are all screw drivers but it is evident that any desired tool may be substituted for one or more of the screw drivers and not change the general character of the implement and even if it had but one swinging tool it is not necessary that said tool shall be a screw driver blade.

After the parts as above described are produced and one or more tools pivoted in the sliding head, the parts may be assembled by putting the spring and friction pin in the transverse hole in the head, compressing the pin sufficiently to let its end pass into the tubular shank and enter the guiding groove. The blades may then all be turned to present their inactive and smooth ends outwardly as three of the four blades are shown in Fig. 2 and the sliding head pushed into the handle ready for carrying the implement in the pocket. If however some particular tool is desired for use the head may be pulled out of the handle, the notches 16 in the inactive ends of the blades serving as a convenient handle for so doing, and the blade designed for immediate use turned to present its working end outwardly. The head and all of the tools are then forced inwardly when the forked inner end of the sliding tool head engages the cross pin and thereby firmly locks said head against rotation within the handle so that the head may be driven with a rotary motion in either direction with as much power as if the force to drive it were applied directly to the head itself. The friction pin will hold the head against accidental displacement when thus set within the handle and as soon as longitudinal pressure is given the handle to force one of the tools to its work said pressure will insure the head being seated firmly in place with the cross pin and forked end of the head in engagement. The friction pin and groove also serve to properly guide the head in its sliding motion and prevent accidental rotation within the handle when the forked end is drawn away from the cross pin. Inasmuch as the guiding groove runs into the hole 7 the outer wall of said hole constitutes practically the outer end of the groove against which the friction pin strikes when the head is pulled out and prevents the head from being wholly withdrawn from the handle. The diameter of the hole 7 is less than that of the end of the friction pin 13 so that a portion of said pin is in the guiding groove when the head is drawn clear out as shown in Fig. 3.

If desired to detach the head from the handle it is only necessary to insert some small device into the hole 7 and depress the pin sufficiently to escape the outer end of the guiding groove. While the hole 7 is a convenience for removing the head and forming the outer end of the guiding groove it is not essential to an operative device as the head might be detached by giving the handle and head a rotary motion under considerable force in opposite directions when the slanting wall of the guiding groove and end of the friction pin would force said pin inward sufficiently to permit the head to be removed.

I claim as my invention—

1. A pocket implement consisting of a handle having a tubular shank and cross rib or pin 9, the sliding tool carrying head having a forked inner end for interlocking with said cross rib or pin when forced inwardly, substantially as described and for the purpose specified.

2. A pocket implement consisting of a handle having a tubular shank, a longitudinal guiding groove and cross rib or pin, the sliding tool carrying head fitted to said shank and having at its inner end a slot for locking engagement with said cross rib and the spring pressed friction pin engaging said guiding groove of the tubular shank, substantially as described and for the purpose specified.

3. In a pocket implement having a sliding tool carrying head, the tubular shank having the guiding groove 8 and hole 7 at the outer end of said groove, the spring pressed friction pin in said head and in engagement with said groove, the width of said pin in the longitudinal direction of said groove being in excess of the width of said hole, substantially as described and for the purpose specified.

ARTHUR B. STONE.

Witnesses:
JAMES SHEPARD,
A. W. STIPEK.